United States Patent Office 3,718,621
Patented Feb. 27, 1973

3,718,621
SOLID STATE POLYMERIZATION PROCESS
Warren K. Wilson, Cuyahoga Falls, Ohio, assignor to The Goodyear Tire & Rubber Company, Akron, Ohio
No Drawing. Filed Sept. 17, 1969, Ser. No. 858,876
Int. Cl. C08g 17/01
U.S. Cl. 260—75 M         2 Claims

ABSTRACT OF THE DISCLOSURE

The invention is a process for carrying out the polymerization of polyethylene terephthalate polymer in solid state at a temperature above the normal melting point of the polymer in which the polymer is heated at a temperature in the range of from about 1 to about 10° C. below its melting point and as the melting point of the polymer increases raising the temperature to maintain it within the range of from about 1 to about 10° C. below the increased melting point.

---

This invention relates to the polymerization of polyethylene terephthalate in solid state. More particularly the invention relates to an improvement in the solid state polymerization whereby the polymerization can be carried out at higher temperatures and accelerated rates.

In solid state polymerization polymer is formed to low molecular weight state by regular processes such as ester interchange and condensation and then is solidified and cut or otherwise reduced to a finely divided state and heated in solid form under conditions that will remove gaseous products. The polymer may be heated in a stream of a dry inert gas such as nitrogen or it may be heated under conditions of high vacuum. Treatment under these conditions is continued until the desired molecular weight is obtained. The temperature range that can be used for the solid state polymerization is limited by the sticking temperature and the melting point of the resin.

In the solid state polymerization of polyethylene terephthalate the polymerization is generally carried out at a temperature of about 240° C. This temperature is just below the sticking temperature of the resin and is about 20° C. below the melting point of the resin.

Now according to the present invention it has unexpectedly been found that the solid state polymerization temperature may be raised by 20 to 25° C. above the normal melting point of the polyester resin. Thus, according to the present invention it has been found that when polyethylene terephthalate is heated at a temperature just below its melting temperature, i.e., in the range of about 1 to 10° C. below its melting point, the resin apparently changes and temporarily the resin has a higher melting point. As the crystalline structure changes the melting temperature of the resin changes and the temperature of treatment can be adjusted upwards to within a few degrees of the higher melting point and again the melting point of the resin rises as the crystalline structure again is modified. This stepwise raising of the temperature can be continued until the melting temperature of as much as 20 to 25° C. above the original melting point of the polyester resin is attained. Polymerization can then be continued at this higher temperature which is well above the original melting point.

In a programmed procedure according to the invention, the temperature of the polymer can be raised at about 0.5° C. per minute, starting at a temperature of about 1° to 10° C. below the melting point of the polymer. At this heating rate the melting point of the polymer gradually moves upwards, staying ahead of the rising heating temperature, until a temperature of 20° to 25° C. above the original melting point of the polymer. Thus the polymer normally melting at 256° C. can have its melting point increased to as high as 282° C. Solid state polymerization can thus be carried out at any temperature desire between the original 256° C. melting point and 282° C.

The following examples illustrate the process of the invention. In these examples parts and percentages are by weight unless otherwise specified.

EXAMPLE 1

Polymeric polyethylene terephthalate having an intrinsic viscosity of 0.639 was prepared as follows:

A mixture of 100 pounds dimethyl terephthalate, 67.1 pounds ethylene glycol, and 0.034 pound manganese acetate tetrahydrate were heated together in a reactor equipped with heating jacket, agitator, and fractionating column. Methanol evolved was removed through the column and the temperature was gradually increased until methanol evolution had ceased at 210° C. The reaction mixture was transferred to a second vessel equipped as the one above, and heating was continued to 230°, with glycol evolution. At 230° C., 0.048 pound of triphenyl phosphite was added, and the temperature of the mixture was raised over a 20 minute period to 250° C. Then 0.025 pound of antimony trioxide was added. The pressure within the vessel was gradually reduced and the temperature slowly raised. The mixture was transferred to a third vessel where it was heated at 280° C. and less than one millimeter of mercury pressure until after about 1.5 hours the desired viscosity was attained by the reaction mixture. The polymer was extruded out under nitrogen pressure and diced into ⅛ inch cubes. This polymer had an intrinsic viscosity of 0.639, measured in 60/40 phenol/tetrachloroethane at 30.0° C.

The polymer had a melting point of 256° C. as measured on a Differential Thermal Analyzer at a heating rate of 5° C. per minute.

The polymer prepared above was divided into two batches which were dried at 130° C. for 18 hours at 0.01 millimeter of mercury pressure. The two samples were placed in a solid state polymerization apparatus and subjected to solid state polymerization conditions as follows:

EXAMPLE 2

|  | Temperature, ° C. | | Pressure in millimeters of mercury |
|---|---|---|---|
|  | Sample 1 | Sample 2 |  |
| Time (minutes): |  |  |  |
| 0 | 130 | 130 | 0.01 |
| 10 | 180 | 180 | 0.01 |
| 30 | 220 | 220 | [1] 0.30 |
| 45 | 245 | 245 | 0.30 |
| 57 | 247 | 245 | 0.30 |
| 59 | 249 | 245 | 0.30 |
| 60 | 250 | 245 | 0.30 |
| 66 | 251 | 245 | 0.30 |
| 68 | 252.5 | 245 | 0.30 |
| 70 | 254 | 245 | 0.30 |
| 72 | 256 | 245 | 0.30 |
| 74 | 258 | 245 | 0.30 |
| 81 | 262.5 | 245 | 0.30 |
| 87 | 265 | 245 | 0.30 |
| 477 | 265 | 245 | 0.30 |
| Melting point of product | 273 | 257 |  |
| Intrinsic viscosity | 1.204 | 0.954 |  |

[1] Added N² purge.

NOTE.—The above data show that by gradually increasing the temperature the polymerization can be carried out at 265° C., which is 9° C. above the normal melting point of polyethylene terephthalate, which is 256° C.

The intrinsic viscosities of the polymer prepared according to the present invention and the control polymer prepared according to the process of the prior art were as indicated above 1.204 and 0.954 respectively. The data show that the process of this invention results in a faster reaction rate and that higher molecular weight polymer can be obtained in a given time with the present invention than with the prior process.

In this work, for resin of very high molecular weight and high crystallinity content, such as the solid state polymerized resin having an intrinsic viscosity of 0.8 or higher, intrinsic viscosity determinations were made on a solution containing 0.1 gram of polymer dissolved in 25 milliliters of a 50/50 mixture (by weight) of trifluoroacetic acid and dichloromethane at 30.0° C. and converted to the phenoltetrachloroethane scale by interpolation from a table that interrelates results obtained by the two methods.

The foregoing examples illustrate the invention particularly with respect to polyethylene terephthalate made from feed polymer prepared from dimethyl terephthalate and glycol by ester interchange and condensation. In place of dimethyl terephthalate other ester forming derivatives such as the ethyl, propyl, butyl and phenyl esters can be used. The feed polymer can also be prepared by reacting terephthalic acid with glycol to form the corresponding glycol esters. The glycol esters are condensed at a temperature in the range of from 250° to 290° C. at a perssure of less than one millimeter of mercury pressure with the elimination of glycol to form a solid resin which is then divided into small particles and condensed by solid state according to the process illustrated above.

As set out above, polyethylene terephthalate made according to the process of this invention has a melting point above the normal melting point of polyethylene terephthalate. It has been found that this new increased melting point is not permanently retained by the polymer, but when the polymer is melted and allowed to crystallize, the melting point reverts to its original temperature.

The new increased or abnormal melting point can be regulated by regulating the temperature of treatment during the solid state polymerization. Thus those skilled in the art know that polyethylene terephthalate generally contains some ether linkages of the diethylene glycol type that lower the melting point of the resin somewhat and the amount the melting point is lowered depends on the amount or percent of ether linkages contained in the resin. Thus polyethylene terephthalate containing about 1 mol percent based on the glycol content of ether linkages and having a normal melting point of 256° C. (determined on a Differential Thermal Analyzer) treated according to this invention at a maximum temperature of 260° C. will attain a melting point of about 268° C. When the same polymer is treated according to the invention at a maximum temperature of 265° C. it will attain a melting point of about 273° C. and when treated at a maximum temperature of 270° C. will attain a melting temperature of 278° C. Polymer having somewhat different ether content will have its melting point similarly increased.

The invention has been illustrated with respect to operating under reduced pressure. The invention can also be operated under reduced pressure as well as at atmospheric pressure or superatmospheric pressure using a sweep of an inert gas such as nitrogen to remove volatile materials eliminated from the polymer as it polymerizes to higher molecular weight and the advantages of the invention obtained.

While certain representative embodiments and details have been shown for the purpose of illustrating the invention it will be apparent to those skilled in this art that various changes and modifications may be made therein without departing from the spirit or scope of the invention.

What I claim is:

1. In the solid state polymerization of polyethylene terephthalate polyester resin the improvement which comprises: (a) heating the resin to a temperature in the range from about 1° to 10° C. below its normal melting temperature and then (b) increasing the temperature of treatment as the melting point of the resin increases until the temperature of treatment is above the normal melting point of the resin.

2. In the solid state polymerization of polyethylene terephthalate polyester resin the improvement which comprises: (a) heating the resin to a temperature in the range from about 1° to 10° C. below the normal melting temperature of the resin and then (b) increasing the temperature of treatment at a rate of less than 1° C. per minute until the temperature of treatment is in the range of from about the normal melting point of the resin to about 25° C. above the normal melting point of the resin.

References Cited

UNITED STATES PATENTS

| | | | |
|---|---|---|---|
| 2,921,652 | 1/1960 | Caldwell et al. | 260—75 |
| 3,075,952 | 1/1963 | Coover et al. | 260—75 |
| 3,117,950 | 1/1964 | Kibler et al. | 260—75 |
| 3,405,098 | 10/1968 | Heighton et al. | 260—75 |

OTHER REFERENCES

Full text of Rybnikar (of record) supplied.

Yoshimoto et al., Kogyo Kagaku Zasshi 69, 1771–75 (1966).

Rybnikar, Makromol. Chem. 110, 268–77 (1967) (Chem. Abstr. supplied).

Ikeda et al., Kobunshi Kagaku 24, 378–84 (1967) (Chem. Abstr. supplied).

MELVIN GOLDSTEIN, Primary Examiner

U.S. Cl. X.R.

260—75 T